United States Patent
Le Crom et al.

(10) Patent No.: US 6,663,962 B2
(45) Date of Patent: Dec. 16, 2003

(54) PROCESS FOR THE PREPARATION OF POROUS POWDERS FORMED OF COPOLYESTERAMIDES AND POWDERS THUS OBTAINED

(75) Inventors: Christophe Le Crom, Pau (FR); Roland Guerin, Pau (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/901,574

(22) Filed: Jul. 11, 2001

(65) Prior Publication Data

US 2002/0082382 A1 Jun. 27, 2002

(30) Foreign Application Priority Data

Jul. 11, 2000 (FR) .............................. 00 09048

(51) Int. Cl.⁷ ................................ B32B 5/66
(52) U.S. Cl. ................. 428/402; 428/407; 528/312; 528/315; 528/323; 525/92 A; 525/178; 525/165; 524/227
(58) Field of Search ................. 428/402, 407; 528/315, 312, 323; 524/227; 525/92 A, 178, 165

(56) References Cited

U.S. PATENT DOCUMENTS

| | | | |
|---|---|---|---|
| 3,558,568 A | * | 1/1971 | Kobayashi |
| 4,694,063 A | | 9/1987 | Hilaire et al. |
| 4,831,061 A | | 5/1989 | Hilaire et al. |
| 4,927,860 A | | 5/1990 | Hilaire et al. |
| 6,486,257 B1 | * | 11/2002 | White et al. ................ 525/165 |

FOREIGN PATENT DOCUMENTS

| | | |
|---|---|---|
| EP | 303 530 | 2/1985 |
| EP | 192 515 | 8/1986 |
| FR | 1 528 292 | 10/1968 |
| FR | 2 576 602 | 8/1986 |
| FR | 2 619 385 | 2/1989 |
| GB | 1 099 456 | 1/1968 |

* cited by examiner

*Primary Examiner*—Leszek Kiliman
(74) *Attorney, Agent, or Firm*—Millen, White, Zelano & Branigan, P.C.

(57) ABSTRACT

For the preparation of powders formed of copolyesteramides by anionic polymerization, at least one lactam and at least one lactone are copolymerized in solution in a solvent in the presence of a catalyst and of an activator, the solvent being a solvent of the lactam and the powders being insoluble in the solvent. Preferably at least two lactams and at least one lactone are copolymerized, and the copolymerization is preferably carried out in the presence of a finely divided organic or inorganic filler. The copolymerization is preferably carried out in the presence of an N,N'-alkylenebisamide, such as ethylenebisstearamide (EBS) disclosed in EP 192 515, or generally amides of formula R1—NH—CO—R2, in which R1 can be replaced by an R3-CO—NH— or R3-O— radical and in which R1, R2 and R3 denote an aryl, alkyl or cycloalkyl radical. Powders are obtained formed of copolyesteramides comprising, in moles (the total being 100%): 1 to 98% of a lactam, 1 to 98% of another lactam, 1 to 98% of a lactone, which have a diameter of between 1 $\mu$m and 200 $\mu$m and a specific surface of between 1 and 25 $m^2/g$.

25 Claims, No Drawings

PROCESS FOR THE PREPARATION OF POROUS POWDERS FORMED OF COPOLYESTERAMIDES AND POWDERS THUS OBTAINED

FIELD OF THE INVENTION

The present invention relates to a process for the preparation of porous powders formed of copolyesteramides and to the powders thus obtained. It concerns a synthesis of anionic type from at least one lactam and from at least one lactone. The powders obtained have a diameter of between 1 μm and 200 μm, a specific surface of between 1 and 25 m$^2$/g and a melting temperature of between 80° C. and 220° C. These powders are of use in making pigment paper, that is to say structures comprising (i) a fibrous substrate and a hot melt adhesive layer and (ii) comprising these powders. A design or text is printed on this paper, the ink is retained in the porosity of the powders, this pigment paper is then pressed under hot conditions on a textile and the design or the text is transferred onto the textile. These powders are also of use in cosmetic compositions.

BACKGROUND OF THE INVENTION

Patent EP 192 515 discloses the anionic polymerization of a lactam in a solvent in the presence of an N,N'-alkylenebisamide. A polyamide powder is obtained, the melting temperature of which is that of PA 6 or PA 12, that is to say 220° C. and 180° C. respectively. The joint use of lactams 6 and 12 makes it possible to lower the melting point to approximately 140° C. where the composition with regard to lactams is 50/50. However, this temperature is sometimes too high for certain applications.

Patent EP 303 530 discloses a process very similar to the above process, the powder particles are composed of flakes and have a so-called gypsum flower structure. The melting temperature is the same as in the preceding prior art.

British Patent GB 1 099 184 from 1966 discloses the synthesis of lactam/lactone copolymers by anionic polymerization in a bulk process. The author of this patent describes these syntheses in greater detail in a series of articles in the review European Polymer Journal:

20(3), 241–247, 1984
20(6), 529–537, 1984
20(6), 539–547, 1984
20(6), 549–557, 1984

These polyesteramides obtained by these bulk processes exhibit melting points of less than 140° C. but thus have to form the subject of a treatment, such as milling, in order to be used in the powder form. This stage is expensive and does not make possible the preparation of fine powders with a diameter <50 μm. In addition, these powders do not exhibit any porosity.

Patent Application JP 08 325 406 A, published on Dec. 10, 1996, discloses particles of aliphatic esteramide copolymer by dissolution in a solvent, followed by precipitation. Particles of 0.5 to 50 μm are disclosed. However, the particle size is very dispersed and many particles are agglomerated.

SUMMARY OF THE INVENTION

It has now been found that, by copolymerizing at least one lactam and at least one lactone in a solvent medium (in which the lactam is soluble and the powders insoluble) and by anionic catalysis, powders are obtained having a diameter of between 1 μm and 200 μm, a specific surface of between 1 and 25 m$^2$/g and a melting temperature of between 80° C. and 220° C. Another advantage of the process of the invention is that the particle size of the powders is very narrow, that is to say that at least 85% by number of the particles and advantageously 90% are within a range of 5 μm. Another advantage of this process is that the particles are porous. Furthermore, the presence of polycaprolactone blocks confers a biodegradable nature on the powders.

BRIEF DESCRIPTION OF THE INVENTION

The present invention relates to a process for the preparation of powders formed of copolyesteramides by anionic polymerization, in which at least one lactam and at least one lactone are copolymerized in solution in a solvent in the presence of a catalyst and of an activator, the solvent being a solvent of the lactam and the powders being insoluble in the solvent.

According to a first preferred form of the invention, at least two lactams and at least one lactone are copolymerized.

According to a second preferred form of the invention, the copolymerization is carried out in the presence of a finely divided organic or inorganic filler.

According to a third preferred form of the invention, the copolymerization is carried out in the presence of an N,N'-alkylenebisamide, such as ethylenebisstearamide (EBS) disclosed in EP 192 515, or generally amides of formula R1-NH—CO—R2, in which R1 can be replaced by an R3-CO—NH— or R3-O— radical and in which R1, R2 and R3 denote an aryl, alkyl or cycloalkyl radical.

The present invention also relates to powders formed of copolyesteramides comprising, in moles (the total being 100%):

1 to 98% of a lactam,
1 to 98% of another lactam,
1 to 98% of a lactone, which have a diameter of between 1 μm and 200 μm and a specific surface of between 1 and 25 m$^2$/g.

The invention also relates to the use of these various powders, in particular in pigment paper and cosmetics.

DETAILED DESCRIPTION OF THE INVENTION

Mention may be made, as examples of lactams, of those which have from 3 to 12 carbon atoms on the main ring and which can be substituted. Mention may be made, for example, of β,β-dimethylpropiolactam, α,α-dimethylpropiolactam, amylolactam, caprolactam, capryllactam and lauryllactam. Caprolactam and lauryllactam are advantageously used.

Mention may be made, as examples of lactones, of caprolactone, valerolactone and butyrolactone. Caprolactone is advantageously used.

As regards the solvent, it is a solvent of the lactam; in contrast, the copolyesteramide powder is insoluble in this solvent. Such solvents are mentioned in Patent EP 192 515. The solvent is advantageously a paraffinic hydrocarbon fraction with a boiling range lying between 140 and 170° C.

The catalyst is a base which is sufficiently strong to create a lactamate. Mention may be made, as examples of catalysts, of sodium, potassium, alkali metal hydrides, alkali metal hydroxides or alkali metal alkoxides, such as sodium methoxide or ethoxide.

As regards the activator, this term is thus used to denote any product capable of bringing about and/or accelerating the polymerization. Mention may be made, as examples, of lactams-N-carboxyanilides, isocyanates, carbodiimides, cyanimides, acyllactams, triazines, ureas, N-substituted imides or esters. The activator can be formed in situ; for example, an acyllactam is obtained by adding an alkyl isocyanate to the lactam.

The ratio of the catalyst to the activator, in moles, can be between 0.2 and 2 and preferably between 0.8 and 1.2. The proportion of catalyst in the lactam can be between 0.1 and 5 mol per 100 mol of monomers (lactams and lactones) and preferably between 0.3 and 1.5.

There are no restrictions on the proportions of lactam and lactone; the process operates with all proportions. However, the advantage is explained later of choosing proportions for adjusting the melting temperature.

The process can be carried out in a stirred reactor equipped with a device for heating via a jacket or a coil, with an emptying system, such as a bottom valve, and with a device for introducing the reactants which is flushed with dry nitrogen. The process can be carried out continuously or batchwise.

The process is advantageously carried out batchwise. The solvent is introduced and then, simultaneously or successively, the lactam, the catalyst, the activator and the lactone. It is recommended to introduce first the solvent and the lactam (or the lactam in solution in the solvent), then to remove any trace of water and, when the medium is completely dry, to introduce the catalyst. The traces of water can be removed by azeotropic distillation. Subsequently, the activator and the lactone are added. The process is carried out at atmospheric pressure and a temperature of between 20° C. and the boiling temperature of the solvent. The duration of the reaction depends on the temperature and decreases when the temperature increases. It is usually between 1 h and 12 h. The reaction is complete, all the monomers are consumed and constitute the copolyesteramide powder. On conclusion of the reaction, the solvent and the powder are separated by filtration or centrifuging and then the powder is dried.

According to an advantageous form of the invention, first the solvent and the lactam are introduced, separately or simultaneously, and then, after removal of the possible water, the catalyst is introduced. Subsequently, the activator and the lactone are introduced, either continuously or portionwise simultaneously or alternately a portion of activator and a portion of lactone or alternately a continuous flow of activator and then a continuous flow of lactone or any combination of these possibilities. Although stages of the process are continuous, it is described as "batchwise" because it is broken down into cycles beginning with the introduction of the solvent into the reactor and ending with the separation of the powder and the solvent.

According to a first preferred form of the invention, at least two lactams and at least one lactone are copolymerized. They are advantageously caprolactam, lauryllactam and caprolactone.

According to a second preferred form of the invention, the copolymerization is carried out in the presence of a finely divided (0.01 µm to 10 µm) organic or inorganic filler. This filler can be added to the reactor after the introduction of the solvent or before the introduction of the lactone. This filler can be, for example, silica. The amount of filler can be from 0.1% to 10% of the weight of lactams.

According to a third preferred form of the invention, the copolymerization is carried out in the presence of an N,N'-alkylenebisamide, such as ethylenebisstearamide (EBS) disclosed in EP 192 515, or generally amides of formula R1-NH—CO—R2, in which R1 can be replaced by an R3-CO—NH— or R3-O— radical and in which R1, R2 and R3 denote an aryl, alkyl or cycloalkyl radical.

As regards more particularly the amides of formula R1-NH—CO—R2 and the R1, R2 and R3 radicals, examples of aryl radicals can be phenyl, para-tolyl or α-naphthyl. Examples of alkyls can be methyl, ethyl, n-propyl and n-butyl radicals and an example of cycloalkyl radicals is cyclohexyl. The preferred amides are those in which R1 and R2, which are identical or different, are phenyl or an alkyl having at most 5 carbon atoms, it being possible for R1 to be replaced by R3-O—, R3 being an alkyl having at most 5 carbon atoms. Mention may be made, for example, of acetanilide, benzanilide, N-methylacetamide, N-ethylacetamide, N-methylformamide and (4-ethoxyphenyl)acetamide. Other preferred amides are alkylenebisamides, such as ethylenebisstearamide (EBS) and ethylenebisoleamide. It would not be departing from the scope of the invention to carry out the polymerization in the presence of two or more amides.

The powders obtained in the process of the invention have a diameter of between 1 µm and 200 µm, a specific surface of between 1 and 25 $m^2/g$ and a melting temperature of between 80° C. and 220° C.

The melting temperature is measured by DSC (abbreviation for Differential Scanning Calorimetry).

The molecular weight of the copolyesteramide powder obtained is determined by measuring the intrinsic viscosity, at 25° C., of a solution of 0.5 g of this powder in 100 g of m-cresol.

The particle size is measured with a Malvern device.

The melting temperature of the powders is essentially determined by the proportion of lactam and of lactone and, to a small extent, by the synthesis temperature.

The higher the proportion of lactone, the lower the melting temperature. Beyond 30 mol % of lactone, the copolyesteramide powder is amorphous and the term "melting temperature" is to be replaced by "glass transition temperature" Tg.

The melting temperature can be adjusted by choosing the proportions of lactone and of the lactam or better still of the lactams.

The size of the particles is determined by the choice of parameters, such as the stirring speed (the more the speed is increased, the more the size of the particles decreases), the monomer/solvent ratio (decrease in the size of the particles when the concentration increases) or the amount of filler.

The apparent specific surface decreases in increasing proportion as the injection of lactone is delayed after the beginning of the injection of the activator.

This delay in the injection of the lactone also results in an increase in the melt viscosity.

The size is advantageously between 1 and 60 µm and preferably between 2 and 12 µm. The specific surface is advantageously between 4 and 22 $m^2/g$.

The present invention also relates, as novel product, to powders formed of copolyesteramides comprising, in moles (the total being 100%):

1 to 98% of a lactam,
1 to 98% of another lactam,
1 to 98% of a lactone,
which have a diameter of between 1 µm and 200 µm and a specific surface of between 1 and 25 $m^2/g$.

These powders can be manufactured by the process described above which constitutes the principal subject-matter of this description.

The melting temperature depends on the proportion of lactams and of the lactone. The powders are advantageously composed of caprolactam, of lauryllactam and of caprolactone. The respective proportions of these constituents are respectively, in moles (the total being 100%):

30 to 46%/30 to 46%/8 to 40%

These proportions result in a melting temperature of 123 to 134° C.

The size is advantageously between 1 and 60 $\mu$m and preferably between 2 and 12 $\mu$m. The specific surface is advantageously between 4 and 22 m$^2$/g.

The invention also relates to the uses of the powders described above. Mention may be made of pigment paper, cosmetics or coatings. In cosmetics, these powders contribute a feel and they can also comprise fragrances. In coatings, they are, for example, added to polyurethane or polyester paints in the technique of the coating of metal sheets (coil coating). Mention may also be made of the use as additive in rubbers or in metal powders or powders formed from other materials which it is desired to sinter, in which they are of use as lubricant during the injection into a mould before the sintering.

EXAMPLES

In the examples below, the aim of which is to illustrate the invention without, however, limiting it, the tests were carried out in a reactor with a capacity of 5 liters equipped with a paddle stirrer, with a jacket in which heating oil circulates, with a system for emptying via the bottom and with a chamber for introducing the reactants which is flushed with dry nitrogen. A vacuum azeotropic distillation device makes it possible to remove any trace of water from the reaction medium.

Example 1

3390 ml of solvent are introduced into the reactor, which is maintained under a slight nitrogen stream, followed successively by 226 g of dry caprolactam, 395 g of dry lauryllactam, 30 g of ethylenebisstearamide and 18 g of finely divided and dehydrated silica (Aerosil R972).

After having started the stirring at 720 rev/min, the mixture is gradually heated to 110° C. and then 350 ml of solvent are distilled off, under a vacuum of 200 torr, in order to azeotropically entrain any trace of water possibly present.

After returning to atmospheric pressure, the catalyst, 8 g of sodium hydride with a purity of 60% in oil, is then rapidly introduced under nitrogen and the mixture is left to stir, still under the nitrogen stream, for 60 minutes.

The reaction medium is cooled to 75° C. before continuously injecting the chosen activator: 30 g of stearyl isocyanate, at the flow rate of 7.9 g/h with a metering pump. 120 minutes after the beginning of the injection of the activator, 228 g of caprolactone are continuously injected over 4 h using a metering pump. 6 hours after the beginning of the injection of the activator, the temperature is brought to 110° C. and maintained for 2 hours.

The polymerization is then completed. The reactor is cooled to 90° C. and the mixture of powder and of solvent is withdrawn via the bottom. After centrifuging and drying, a copolyesteramide powder is obtained with a yield close to 100%, the molar composition of which with regard to lactam 6, lactam 12 and caprolactone is 33/33/33.

The particle size of the powder is centred at 10 $\mu$m and without the least agglomerate. The melting point, measured by DSC, is 123–126° C., with an apparent specific surface of 4.6 m$^2$/g.

Example 2

3390 ml of solvent are introduced into the reactor, which is maintained under a slight nitrogen stream, followed successively by 226 g of dry caprolactam, 395 g of dry lauryllactam, 30 g of ethylenebisstearamide and 18 g of finely divided and dehydrated silica (Aerosil R972).

After having started the stirring at 720 rev/min, the mixture is gradually heated to 110° C. and then 350 ml of solvent are distilled off, under a vacuum of 200 torr, in order to azeotropically entrain any trace of water possibly present.

After returning to atmospheric pressure, the catalyst, 8 g of sodium hydride with a purity of 60% in oil, is then rapidly introduced under nitrogen and the mixture is left to stir, still under the nitrogen stream, for 60 minutes.

The reaction medium is cooled to 75° C. before continuously injecting the chosen activator: 30 g of stearyl isocyanate, at the flow rate of 5 g/h with a metering pump. 120 minutes after the beginning of the injection of the activator, 51 g of caprolactone are continuously injected over 3 h 30 using a metering pump. 5 hours 30 after the beginning of the injection of the activator, the temperature is brought to 110° C. and maintained for 2 hours.

The polymerization is then completed. The reactor is cooled to 90° C. and the mixture of powder and of solvent is withdrawn via the bottom. After centrifuging and drying, a copolyesteramide powder is obtained with a yield close to 100%, the molar composition of which with regard to lactam 6, lactam 12 and caprolactone is 45/45/10.

The particle size of the powder is centred at 8 $\mu$m and without the least agglomerate. The melting point, measured by DSC, is 123–126° C., and the apparent specific surface is 4.6 m$^2$/g.

Example 3

Example 2 is repeated in an identical fashion except for the induction time to the introduction of the caprolactone, which is in this instance 30 minutes, as opposed to 120 in Example 2.

After centrifuging and drying, a copolyesteramide powder with a composition identical to that of Example 2 is obtained with a yield close to 100%, the particle size of which is centred at 8.7 $\mu$m with a particle size distribution of 0.6 and an apparent specific surface of 22 m$^2$/g. However, numerous deposits appear on the walls of the reactor.

Example 4

Examples 2 and 3 are repeated in an identical fashion, except for the induction time to the introduction of the caprolactone, which is in this instance 60 minutes.

After centrifuging and drying, a copolyesteramide powder with a composition identical to that of Examples 2 and 3 is obtained with a yield close to 100%, the particle size of which is centred at 9.3 $\mu$m with a particle size distribution of 3 and an apparent specific surface of 13.6 m$^2$/g. Numerous deposits are present on the walls of the reactor.

Example 5

3390 ml of solvent are introduced into the reactor, which is maintained under a slight nitrogen stream, followed successively by 226 g of dry caprolactam, 395 g of dry lauryllactam, 30 g of ethylenebisstearamide and 18 g of finely divided and dehydrated silica (Aerosil R972).

After having started the stirring at 720 rev/min, the mixture is gradually heated to 110° C. and then 350 ml of solvent are distilled off, under a vacuum of 200 torr, in order to azeotropically entrain any trace of water possibly present.

After returning to atmospheric pressure, the catalyst, 8 g of sodium hydride with a purity of 60% in oil, is then rapidly introduced under nitrogen and the mixture is left to stir, still under the nitrogen stream, for 60 minutes.

The reaction medium is cooled to 75° C. before continuously injecting the chosen activator: 30 g of stearyl isocyanate, at the flow rate of 4 g/h with a metering pump. 30 minutes after the beginning of the injection of the activator, 51 g of caprolactone are continuously injected over 9 h using a metering pump. 10 hours after the beginning of the injection of the activator, the temperature is brought to 110° C. and maintained for 2 hours.

The polymerization is then completed. The reactor is cooled to 90° C. and the mixture of powder and of solvent is withdrawn via the bottom. After centrifuging and drying, a copolyesteramide powder is obtained with a yield close to 100%, the molar composition of which with regard to lactam 6, lactam 12 and caprolactone is 45/45/10.

The particle size of the powder is centred at 7.25 $\mu$m with a particle size distribution of 0.76 and a melting point, measured by DSC, of 134° C. and an apparent specific surface of 19 m$^2$/g. The walls of the reactor exhibit considerable deposition.

Example 6

Example 5 is repeated in an identical fashion, except for the polymerization temperature, which is in this instance 90° C.

The powder obtained exhibits a particle size of 10.4 $\mu$m and a particle size distribution of 0.94. Considerable deposition in the reactor is again recorded in this instance.

Example 7

Example 5 is repeated in an identical fashion, except for the polymerization temperature, which is in this instance 60° C.

The powder obtained exhibits a particle size of 2.9 $\mu$m and a particle size distribution of 0.29. The reactor does not exhibit any deposition.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/09.048, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of powders formed of copolyesteramides by anionic polymerization, in which at least one lactam and at least one lactone are copolymerized in solution in a solvent in the presence of a catalyst and of an activator, the solvent being a solvent of the lactam and the powders being insoluble in the solvent.

2. A process according to claim 1, in which the lactam is caprolactam or lauryllactam.

3. A process according to claim 2, in which the lactone is caprolactone, valerolactone or butyrolactone.

4. A process according to claim 1, in which the lactone is caprolactone, valerolactone or butyrolactone.

5. A process according to claim 1, in which the solvent is a paraffinic hydrocarbon fraction with a boiling range lying between 140 and 170° C.

6. A process according to claim 1, in which the catalyst is sodium, potassium, an alkali metal hydride, an alkali metal hydroxide or an alkali metal alkoxide.

7. A process according to claim 1, in which the activator is a lactam-N-carboxyanilide, an isocyanate, a carbodiimide, a cyanimide, an acylactam, a triazine, a urea, or an N-substituted imide or an ester thereof.

8. A process according to claim 1, in which the reaction is carried out at atmospheric pressure and at a temperature of between 20° C. and the boiling temperature of the solvent.

9. A process according to claim 1, in which first the solvent and the lactam are introduced, separately or simultaneously, then, after removal of the possible water, the catalyst is introduced and, subsequently, the activator and the lactone are introduced, either continuously or portionwise simultaneously or alternately a portion of activator and a portion of lactone or alternately a continuous flow of activator and then a continuous flow of lactone or any combination thereof.

10. A process according to claim 1, in which at least two lactams and at least one lactone are copolymerized.

11. A process according to claim 10, in which caprolactam, lauryllactam and caprolactone are copolymerized.

12. A process according to claim 1, in which the copolymerization is carried out in the presence of a finely divided organic or inorganic filler.

13. A process according to claim 1, in which the copolymerization is carried out in the presence of at least one amide of formula R1-NH—CO—R2, wherein R1 and R2 denote an aryl, alkyl or cycloalkyl radical or R1 is an R3-CO—NH— or R3-O— radical and R3 represents an aryl, alkyl or cycloalkyl radical.

14. A process according to claim 13, in which the amide is ethylenebisstearamide (EBS) or ethylenebisoleamide.

15. A powder comprising a copolyesteramide made from the following monomers, in moles (the total being 100%):
  1 to 98% of a lactam,
  1 to 98% of another lactam,
  1 to 98% of a lactone,
    wherein the powder has particles of a diameter of between 1 $\mu$m and 200 $\mu$m and a specific surface of between 1 and 25 m$^2$/g.

16. A powder according to claim 15, wherein the copolymer is made from caprolactam, lauryllactam and caprolactone.

17. A powder according to claim 16, in which the proportions of caprolactan, lauryllactam and caprolactone are respectively, in moles (the total being 100%):
  30 to 46% /30to46% /8to40%.

18. A Powder according to claim 15, in which the diameter is between 1 and 60 $\mu$m.

19. A powder according to claim 18, in which the diameter is between 2 and 12 $\mu$m.

20. A powder according to claim 15, in which the specific surface is between 4 and 22 m²/g.

21. A process comprising incorporating the powders according to claim 15 in paper, cosmetics or coatings.

22. A process comprising incorporating the powders according to claim 15, in rubbers, or in metal powders, where they are of use as lubricant during the injection into a mould before sintering.

23. A process according to claim 1, wherein the lactone is added to the solution after the beginning of addition of the activator.

24. A process according to claim 1, wherein the delay of addition of the lactone results in an increase in a melt viscosity.

25. A process for the preparation of powders formed of copolyesteramides by anionic polymerization, comprising:

first introducing a solvent and at least one lactam, separately or simultaneously, then, after removing any water, introducing a catalyst and, subsequently, introducing an activator and a lactone, continuously or portionwise simultaneously, or alternatively a portion of activator and a portion of lactone or alternatively a continuous flow of activator and then introducing a continuous flow of lactone or any combination thereof, wherein at least one lactam and at least one lactone are copolymerized in the presence of a finely divided organic or inorganic filler in solution in a solvent in the presence of a catalyst and of an activator, the solvent being a solvent of the lactam and the powders being insoluble in the solvent.

* * * * *